United States Patent
Kuji et al.

(10) Patent No.: US 10,275,626 B2
(45) Date of Patent: Apr. 30, 2019

(54) SHEET BODY, STEROSCOPIC OBJECT, AND INFORMATION CODE READING SYSTEM

(71) Applicant: Sony Interactive Entertainment Inc., Tokyo (JP)

(72) Inventors: Takuya Kuji, Tokyo (JP); Yuichi Machida, Kanagawa (JP); Takeshi Yamagishi, Kanagawa (JP); Kaname Kosugi, Tokyo (JP); Jun Sakamoto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 179 days.

(21) Appl. No.: 15/114,202

(22) PCT Filed: Oct. 22, 2014

(86) PCT No.: PCT/JP2014/078113
§ 371 (c)(1),
(2) Date: Jul. 26, 2016

(87) PCT Pub. No.: WO2015/118734
PCT Pub. Date: Aug. 13, 2015

(65) Prior Publication Data
US 2017/0011247 A1    Jan. 12, 2017

(30) Foreign Application Priority Data
Feb. 7, 2014   (JP) ................................. 2014-021927

(51) Int. Cl.
*G06K 19/00*   (2006.01)
*G06K 7/14*    (2006.01)
(Continued)

(52) U.S. Cl.
CPC ....... *G06K 7/1417* (2013.01); *G06K 7/10722* (2013.01); *G06K 7/12* (2013.01); *G06K 19/0614* (2013.01); *G06K 19/06037* (2013.01)

(58) Field of Classification Search
USPC ................................. 235/435, 439, 454, 462
See application file for complete search history.

(56) References Cited

U.S. PATENT DOCUMENTS

2005/0087605 A1* 4/2005 Auslander .............. G06K 1/123
                                                        235/491
2013/0020393 A1* 1/2013 Hwang ............ G06K 19/06112
                                                       235/462.11
(Continued)

FOREIGN PATENT DOCUMENTS

JP    07-085229    3/1995
JP    09-245115    9/1997
(Continued)

OTHER PUBLICATIONS

Translation of International Preliminary Report on Patentability and Written Opinion of the International Searching Authority dated Aug. 18, 2016 from corresponding Application No. PCT/JP2014/078113.

(Continued)

*Primary Examiner* — Matthew Mikels
(74) *Attorney, Agent, or Firm* — Katten Muchin Rosenman LLP

(57) ABSTRACT

A sheet body 30 includes first and second sheets 40 and 60 that transmit infrared radiation. A rear face of the first sheet 40 is opposed to a front face of the second sheet 60. An information code is marked on a front or rear face of the second sheet 60 by using an infrared absorbing material. The rear face of the first sheet 40 and the front face of the second sheet 60 are stuck together with a highly infrared transmitting adhesive. The front face of the first sheet 40 is marked (Continued)

with a pattern using an infrared transmitting material that is visible when visible radiation is irradiated onto the pattern.

6 Claims, 14 Drawing Sheets

(51) Int. Cl.
*G06K 7/12* (2006.01)
*G06K 19/06* (2006.01)
*G06K 7/10* (2006.01)

(56) References Cited

U.S. PATENT DOCUMENTS

| | | | |
|---|---|---|---|
| 2014/0209685 A1* | 7/2014 | Venkatesha | G06K 19/06131 235/462.04 |
| 2014/0267760 A1* | 9/2014 | Lee | G02B 5/208 348/164 |
| 2015/0380195 A1 | 12/2015 | Matsumoto et al. | |

FOREIGN PATENT DOCUMENTS

| | | |
|---|---|---|
| JP | 10-049642 | 2/1998 |
| JP | 2001-160121 | 6/2001 |
| JP | 2002-102529 | 4/2002 |
| JP | 2002-514931 T | 5/2002 |
| JP | 2005-046649 | 2/2005 |
| JP | 2006-130123 A | 5/2006 |
| JP | 2008-183212 A | 8/2008 |
| JP | 2009-056260 | 3/2009 |
| JP | 2015-92205 A | 5/2015 |
| WO | 93/10870 | 6/1993 |
| WO | 2005/115575 A1 | 12/2005 |
| WO | 2006/041149 | 4/2006 |
| WO | 2006/059611 A1 | 6/2006 |

OTHER PUBLICATIONS

International Search Report dated Feb. 3, 2015 from corresponding Application No. PCT/2014/078113.
Notification of Reasons for Refusal dated Dec. 6, 2016, from the corresponding Japanese Patent Application No. 2015-561157.
Notification of Reasons for Refusal dated Jul. 3, 2018, from the corresponding Japanese Patent Application No. 2017-042950.
Notification of Reasons for Refusal dated Dec. 5, 2017, from the corresponding Japanese Patent Application No. 2017-042950.

* cited by examiner (a)

(b)

F I G. 4
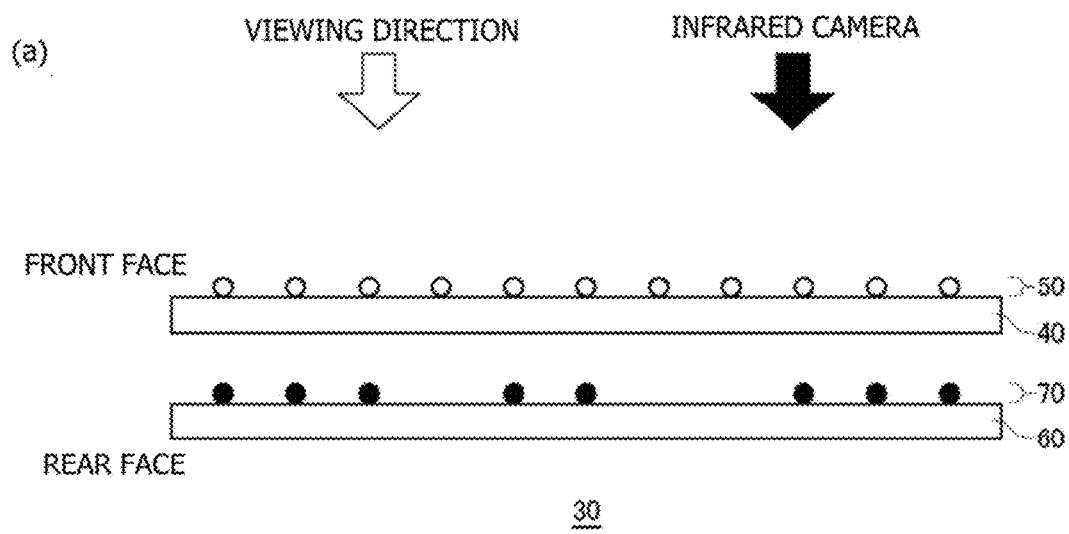
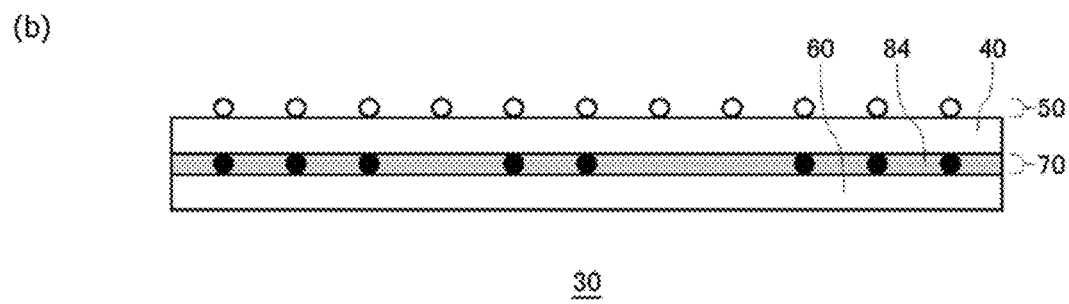

(a)

(b)

(c)

(a)

(b)

(c)

(a)

174

(b)

174

SHEET BODY, STEROSCOPIC OBJECT, AND INFORMATION CODE READING SYSTEM

TECHNICAL FIELD

The present invention relates to a structure of a sheet body having an information code marked thereon or a structure of a stereoscopic object that includes a code section. The present invention relates also to an information code reading system.

BACKGROUND ART

Information codes such as barcode and QR code (registered trademark) have found use in a variety of applications. PTL 1 discloses an information code forming medium on which an information code is printed with a second ink in an area printed with a first ink to provide enhanced security of the information code. The first ink is imaged as transparent when irradiated with infrared radiation, and the second ink is imaged as dark color when irradiated with infrared radiation. Information code in the information code forming medium is embedded in a background and becomes invisible in an environment where the code is irradiated with visible radiation.

On the other hand, an image processing technology has been heretofore proposed to recognize a two-dimensional code by imaging the code with a video camera and show, on a display device, a three-dimensional image appropriate to the two-dimensional code. PTL 2 discloses a rectangular card that includes a two-dimensional code that in turn includes a reference cell, a code data portion, and a plurality of corner cells arranged in such a manner as to enclose the code data portion.

CITATION LIST

Patent Literatures

[PTL 1]
Japanese Patent Laid-Open No. 2013-58078
[PTL 2]
WO 2006/041149 A1

SUMMARY

Technical Problem

Recent years have witnessed a widespread proliferation of collectable card game machines in game centers, toy stores, supermarkets, and other places. In a collectable card game, users collect cards, and they and their opponents shows their cards to allow the game to advance. Each card has one of a variety of drawings or letters representing original monsters, animation characters, and so on. A card is given a characteristic value that represents a character's ability or attribute. How the game advances or who wins varies depending on cards shown by the users. Each of these cards has an information code marked thereon to identify that card. The code is read by a code reader, thus allowing a game system to identify the card and progress the game.

Normally, information codes need only be interpreted by the code reader, and therefore, are not visually comprehensible by humans. As a result, there is no need to mark a card with an information code in such a manner that the code is visible on the card by the user under normal visible radiation. Under such circumstances, the present inventor conceived a sheet body structure with an information code marked thereon that becomes invisible in an environment where the code is irradiated with ordinary visible radiation.

Further, the present inventor conceived of applying, to stereoscopic objects having three-dimensional shapes such as figurines, the technology of the information code that becomes invisible in an environment where the code is irradiated with ordinary visible radiation. Projecting an image onto a sheet body or stereoscopic object allows for projection mapping in a suitable manner.

It is an object of the present invention to provide a sheet body structure and a stereoscopic object structure that render an information code invisible under normal visible radiation.

Solution to Problem

In order to solve the above problem, a sheet body according to a mode of the present invention includes first and second layers that transmit infrared radiation. A rear face of the first layer is opposed to a front face of the second layer. An information code is marked on a front or rear face of the second layer by using an infrared absorbing or reflecting material.

Another mode of the present invention is also a sheet body. The sheet body is made from a material that transmits infrared radiation but not visible radiation. A pattern is marked on a front face of the sheet body using an infrared transmitting material that is visible when irradiated with visible radiation. An information code is marked on a rear face of the sheet body using an infrared absorbing or reflecting material.

Still another mode of the present invention is a stereoscopic object made from a material that transmits infrared radiation. A front face of the stereoscopic object is covered with a material that does not transmit visible radiation. A code section is embedded in the stereoscopic object. The code section is made from an infrared absorbing or reflecting material.

Advantageous Effect of Invention

The present invention provides a sheet body structure and a stereoscopic object structure that render an information code invisible under normal visible radiation.

BRIEF DESCRIPTION OF DRAWINGS

FIG. 4 depicts diagrams illustrating another example of a sectional structure of a sheet body.

DESCRIPTION OF EMBODIMENT

A description will be given of a structure of a sheet body to which code information is added in an embodiment. The sheet body in the present embodiment includes at least two layers (first and second layers) that are arranged such that a rear face of the first layer is opposed to a front face of the second layer. The sheet body is placed on a table such that the front face of the first layer is on a top with the rear face of the second layer on a bottom. Further, the sheet body is mounted to a wall such that the front face of the first layer is on an exposed side with the rear face of the second layer on a wall side.

Each of the first and second layers may be made from a separate sheet, with the sheet body in the shape of a flat plate obtained by sticking the two sheets together. Alternatively, the sheet body may be in a stereoscopic shape with an intermediate layer such as space sandwiched between two sheets. Still alternatively, the first and second layers may have a two-layer structure obtained by coating a single sheet with a given material.

An information code is marked on the front or rear face of the second layer of the sheet body. The information code is printed by using an infrared absorbing material. The first layer is made from a material that does not transmit (e.g., reflects) visible radiation but transmits infrared radiation. When the sheet body is placed on a table, visible radiation is reflected by the first layer, thus keeping the information code printed on the second layer out of view of the user. On the other hand, the first layer transmits infrared radiation. This allows an information code reader having an infrared sensor to detect the information code marked on the second layer, the bottom layer. Thus, the sheet body in the present embodiment has a structure that renders the information code invisible under normal visible radiation.

When the information code reader detects the information code, the processor performs a processing task associated with the information code. For example, if the sheet body is used as a card in a card game system, the processor may control illumination light patterns of a projection device such that an image associated with the sheet body is projected onto the sheet body from the projection device. The information code is a one- or two-dimensional code. The projected image may be a still image. However, projecting a movie for effects of the game provides more excellent visual effects.

Figure 1:
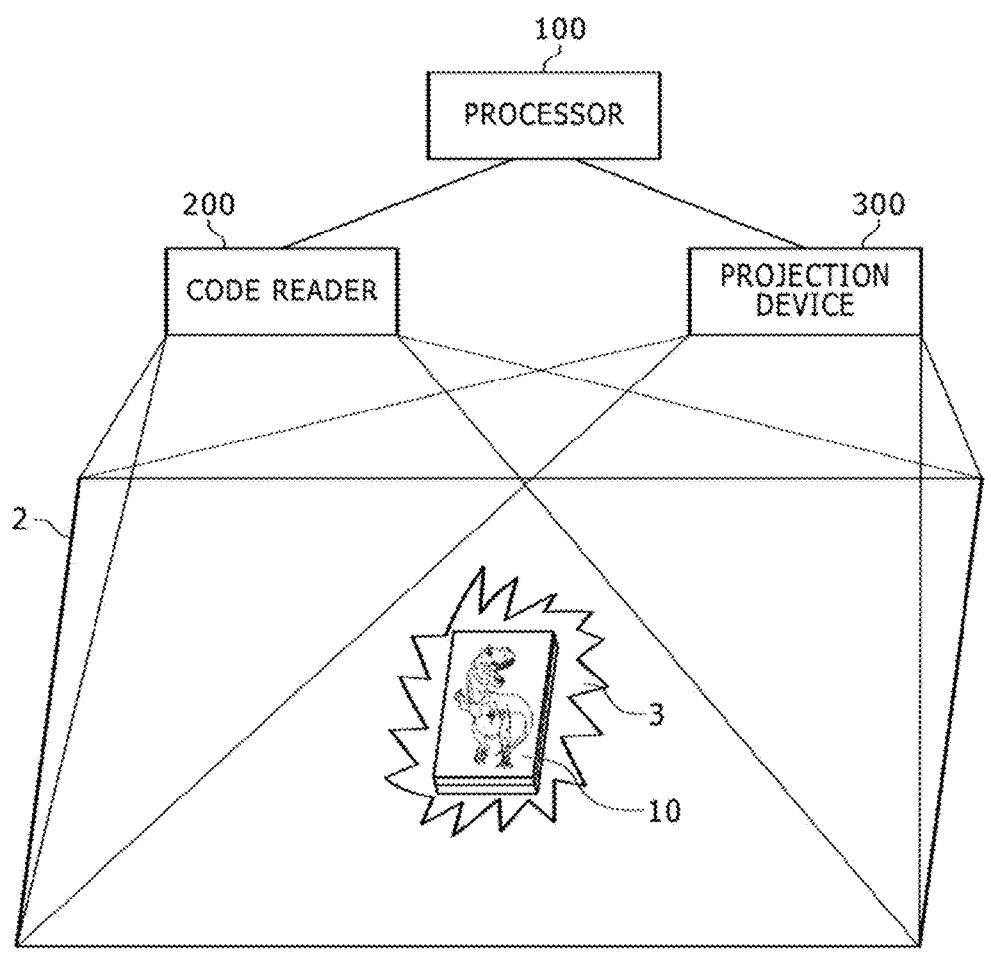
FIG. 1 is a diagram illustrating an image projection system according to an embodiment of the present invention.

FIG. 1 illustrates an image projection system 1 according to an embodiment of the present invention. A card placement area 2 is formed in the image projection system 1. The user places a card 10 with an information code within the card placement area 2. The card placement area 2 may be, for example, enclosed by a frame line printed on a table such that the user can view the area where the card 10 can be placed. Alternatively, the card placement area 2 may be on a table used exclusively for card games. The user may be allowed to place the plurality of cards 10 in the card placement area 2, and in the case of a head-to-head game, each of the plurality of users may place the cards 10 in the card placement area 2.

A code reader 200 is provided above the card placement area 2 and has a sensor to detect the card 10 placed in the card placement area 2, and more specifically, a sensor to detect an information code marked on the card 10. The code reader 200 should preferably detect the card 10 no matter where the card 10 is placed in the card placement area 2. In the embodiment, the code reader 200 is an infrared camera having an infrared radiation source and an infrared sensor.

It should be noted that although described as an area enclosed by a frame line, the card placement area 2 defines an area where the user is allowed to place the card 10. In the present embodiment, therefore, an area where the card 10 can be detected by the code reader 200 may be referred to as the card placement area 2. It should be noted that a system that includes a processor 100, the code reader 200, and the card 10 in the image projection system 1 may be referred to as an information code reading system.

A projection device 300 projects an image onto the card 10. The projection device 300 should preferably be able to project an image over the entire card placement area 2. The projection device 300 may be a projector that projects image light onto the card placement area 2. The projection device 300 is provided above the card placement area 2 and projects image light onto the card 10 from above. It should be noted that a target onto which image light, visible radiation, is projected is not limited to plate-shaped media such as the cards 10 in the present embodiment, and that image light may be projected onto a stereoscopic medium having a three-dimensional shape. If image light is projected onto a stereoscopic medium, the projection device 300 may project image light onto a stereoscopic medium itself. Alternatively, the projection device 300 may project image light onto a reflecting member (mirror) such that reflected light is projected onto the stereoscopic medium.

The processor 100 acquires position coordinates of the card 10 by using a detection result of the code reader 200, controlling image projection of the projection device 300 in accordance with the acquired position coordinates. The processor 100 is a computer capable of receiving an information code detection result from the code reader 200 and reflecting the detection result into projection control of the projection device 300. FIG. 1 depicts that the code reader 200 detects the information code marked on the card 10 in the card placement area 2, and that the processor 100 causes an effect image 3 to be projected from the projection device 300 around the card 10 whose position coordinates have been identified. It should be noted that the information code formed on the second layer of the card 10 is invisible to the user when the card 10 is placed in the card placement area 2.

When the processor 100 identifies the card 10 on the basis of the detection result of the code reader 200, it controls the projection device 300 such that the effect image 3 associated with the card 10 is projected onto the card 10. A drawing or letter (these are together referred to as a "pattern") is printed on the front face of the card 10 with an ink that is visible under visible radiation. The user can see the pattern printed on the front face of the card 10 in a normal environment (under visible radiation). It should be noted that a pattern may be not printed on the front face of the card 10. In that case, the projection device 300 may project an effect image onto and around the front face of the card 10.

In the image projection system 1, the card 10 is an example of a sheet body with an identification code. The identification code is printed on the bottom layer of the card 10 that has a laminated structure using an infrared absorbing material that offers high infrared absorption coefficient (low infrared reflection coefficient). The identification code is detected by the code reader 200, an infrared camera.

A description will be given below of a structure of a sheet body in the present embodiment. The sheet body of the present embodiment includes, as a basic structure, first and second layers that transmit infrared radiation. A rear face of the first layer is opposed to a front face of the second layer. There are two possible cases, one in which the second layer transmits infrared radiation, and another in which the second layer reflects infrared radiation. An information code is marked on a front or rear face of the second layer by using an infrared absorbing material. As described earlier, the information code is invisible to the user, and, on the other hand, detected by the code reader 200.

Figure 2:
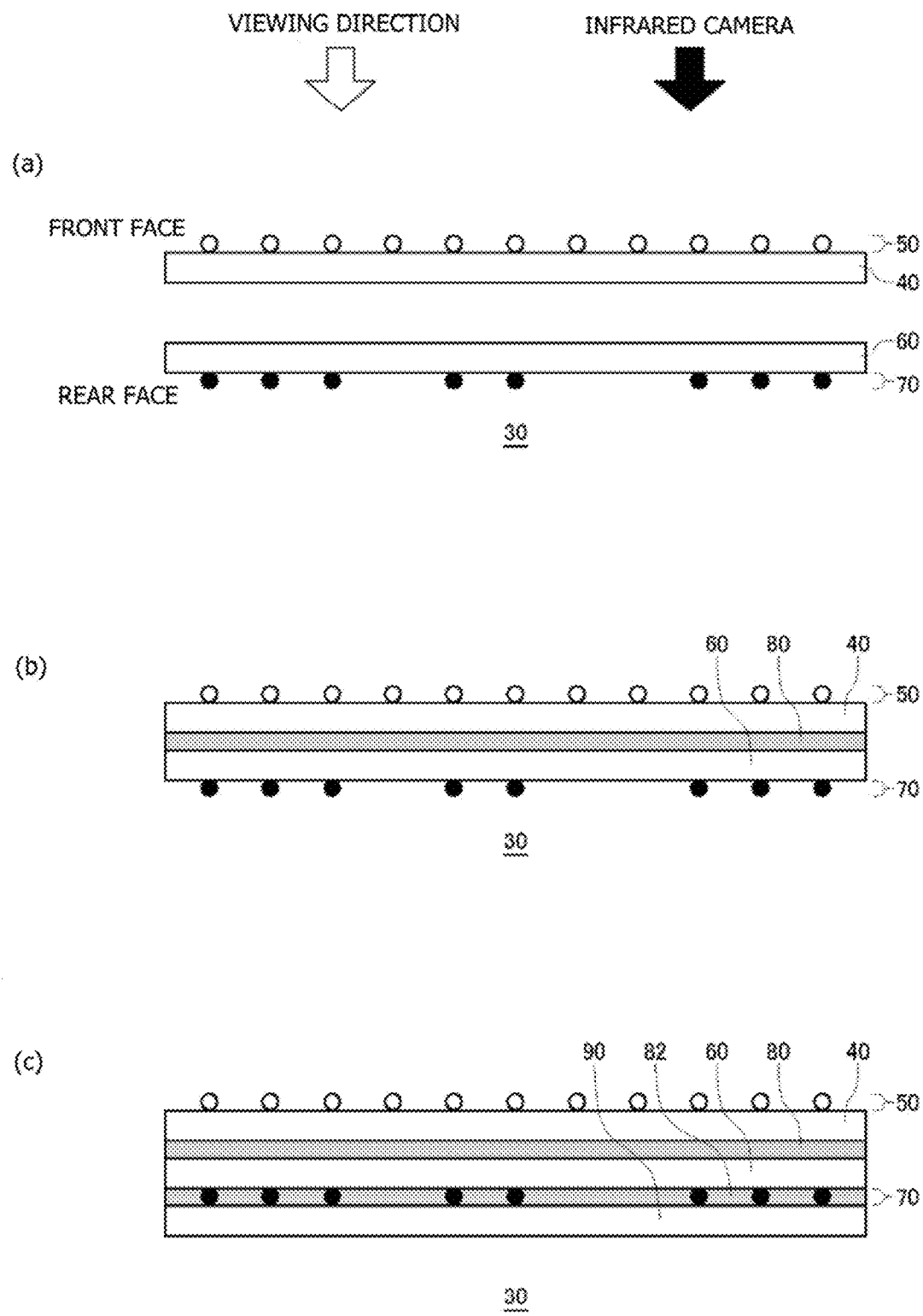
FIG. 2 depicts diagrams illustrating an example of a sectional structure of a sheet body.

FIG. 2(*a*) illustrates an example of a sectional structure of a sheet body. A sheet body 30 includes first and second sheets 40 and 60. Here, the first sheet 40 makes up a first layer of the sheet body 30, and the second sheet 60 makes up a second layer of the sheet body 30. A printing layer 50 is provided on a front face of the first sheet 40. A pattern is marked on the printing layer 50 by using an infrared non-absorbing material (infrared transmitting material). Further, a printing layer 70 is provided on a rear face of the second sheet 60. An information code is marked on the printing layer 70 by using an infrared absorbing material. The rear face of the first sheet 40 and the front face of the second sheet 60 are opposed to each other. An intermediate layer such as air layer that transmits infrared radiation may be provided between the rear face of the first sheet 40 and the front face of the second sheet 60. The first layer 40 is made from a material that transmits infrared radiation but not visible radiation (e.g., reflects visible radiation). The first layer 40 may be basically white film designed to transmit infrared radiation and cut visible radiation. On the other hand, the second sheet 60 is made from a material that transmits infrared radiation and may be, for example, a transparent sheet such as overhead projector (OHP) sheet.

The printing layers 50 and 70 may be each formed by printing an ink using, for example, an ink jet printer. The present inventor has found that commercial dye color inks have high infrared transmittance and that commercial pigment black inks have low infrared transmittance (high infrared absorbance) through an experiment. Therefore, a pattern may be printed on the printing layer 50 using a dye color ink, and an information code on the printing layer 70 using a pigment black ink.

In the present embodiment, an infrared non-absorbing material used to form a pattern on the printing layer 50 has high transmittance in the infrared region and transmits infrared radiation when irradiated therewith. Therefore, a pattern printed using an infrared non-absorbing material is imaged as a transparent area by an infrared camera. It should be noted that an infrared non-absorbing material used to print a pattern has high reflectance of visible radiation and reflects visible radiation when irradiated therewith, allowing the pattern to be imaged with a visible radiation camera and be visible to the user.

On the other hand, an infrared absorbing material used to form an information code on the printing layer 70 has high absorbance in the infrared region and absorbs infrared radiation when irradiated therewith. Therefore, an information code printed using an infrared absorbing material is recognized as a dark color such as black and imaged as such by an infrared camera. It should be noted that an infrared absorbing material absorbs visible radiation when irradiated therewith and is imaged as a dark color by a visible radiation camera. It should be noted that an infrared absorbing material need not absorb all light waves in the infrared region and need only have a reflection coefficient that prevents erroneous detection of reflected infrared radiation by the sensor of the code reader 200.

Figure 3:
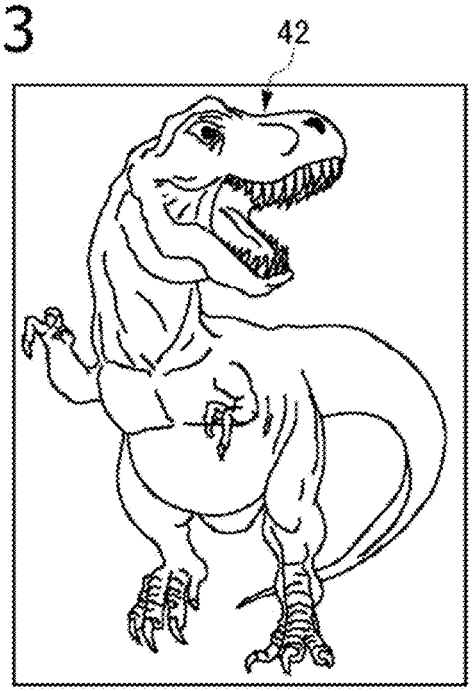
FIG. 3(a) is a diagram illustrating an example of a pattern marked on a first sheet.
FIG. 3(b) is a diagram illustrating an example of an information code marked on a second sheet.
Figure 3:
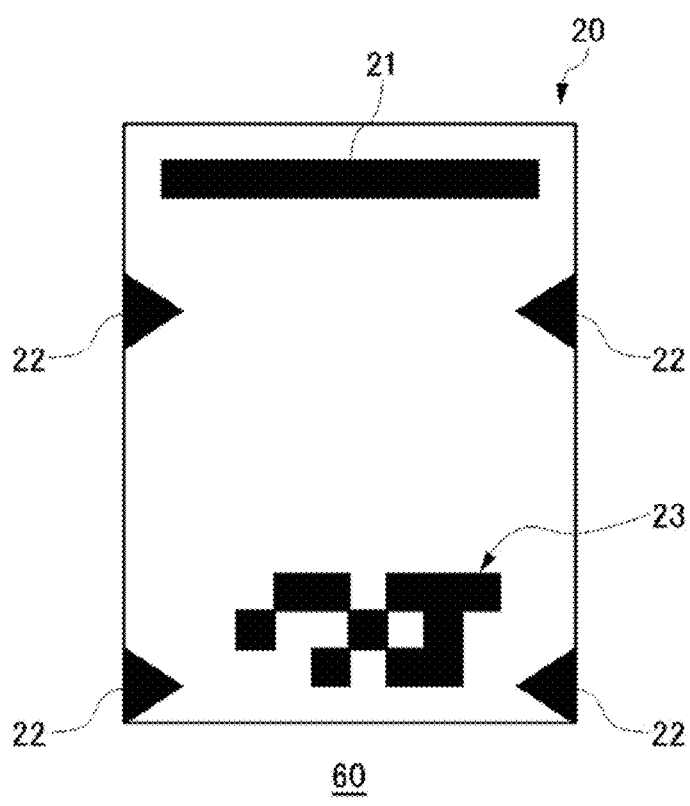

FIG. 3(*a*) illustrates an example of a pattern marked on the front face of the first sheet 40. A pattern 42 makes up the printing layer 50 and is printed using an infrared non-absorbing material that reflects visible radiation and transmits infrared radiation. This allows the user to visually confirm the pattern 42 marked on the front face of the first sheet 40 under normal visible radiation.

FIG. 3(*b*) illustrates an example of an information code marked on the rear face of the second sheet 60. An information code 20 makes up the printing layer 70 and is printed using an infrared absorbing material that absorbs infrared radiation. The information code 20 is formed, for example, as a two-dimensional code disclosed in PTL 2. The information code 20 includes a reference cell 21, a plurality of square cells 23, and a plurality of corner cells 22. The reference cell 21 is in a given shape. The square cells 23 are arranged two-dimensionally to make up code data. The corner cells 22 are arranged to surround the square cells 23. In the information code 20, a positional relationship between the reference cell 21 and the corner cells 22 remains unchanged, allowing code data to be identified by the layout of the plurality of square cells 23. On the rear face of the second sheet 60, the information code 20 made up of the reference cell 21, the corner cells 22, and the square cells 23 has high infrared absorbance as compared to areas without the information code 20. When the information code 20 is read by the code reader 200, areas printed with the information code 20 are imaged as black, and those without the information code 20 as transparent.

In the card game system, the information code need only identify the sheet body 30 and may be a two-dimensional code of other kind, or even a one-dimensional code. A typical example of a one-dimensional code is barcode, whereas a typical example of a two-dimensional code is QR code (registered trademark). However, the information code may be anything as long as it can uniquely identify the sheet body 30. For example, the information code may be an illustration of a character that allows identification of the sheet body 30 through pattern matching by the processor 100.

Referring to FIG. 2(*a*), the sheet body 30 is placed, for example, in the card placement area 2 of a table such that the front face of the first sheet 40 is opposed to a direction of line of sight of the user and that of the code reader 200 (infrared camera) (i.e., such that the front face of the first sheet 40 faces up). Here, the first sheet 40 is made from a material that does not transmit visible radiation. Therefore, there is no likelihood for the user to visually recognize the information code 20 marked on the second sheet 60 that is located under the first sheet 40 under visible radiation. As a result, the user sees the pattern 42 printed on the front face of the first sheet 40 without being aware of the information code 20 marked on the sheet body 30 under visible radiation. Thus, the information code 20 is provided on the sheet body 30 in such a manner as to be invisible.

On the other hand, the code reader 200 irradiates the card placement area 2 with infrared radiation, observing reflected radiation from the sheet body 30 with its infrared sensor. Infrared radiation irradiated onto the sheet body 30 transmits the printing layer 50 and the first sheet 40, infrared transmission layers, and further the second sheet 60 as well, being absorbed by the infrared absorbing material that forms the information code 20. It should be noted that the second sheet 60 is made from a material that transmits infrared radiation in the sheet body 30 illustrated in FIG. 2(a), and that infrared radiation not absorbed by the infrared absorbing material is reflected by the table surface on which the sheet body 30 is placed and observed by the infrared sensor. Therefore, the infrared sensor detects the information code 20 as a black area. Thus, the code reader 200, an infrared camera, is arranged above the sheet body 30 and irradiates infrared radiation onto the front face of the first sheet 40, thus allowing for proper reading of the information code 20 illustrated in FIG. 3(b).

FIG. 2(b) illustrates a structure in which the rear face of the first sheet 40 and the front face of the second sheet 60 are stuck together with an adhesive. The sheet body 30 offers enhanced rigidity thanks to the sticking of the first and second sheets 40 and 60. An adhesion layer 80 is made from an adhesive that transmits infrared radiation. The adhesion layer 80 ensures that infrared radiation that enters the front face of the first sheet 40 reaches the printing layer 70. A laminated body made up of the first sheet 40, the adhesion layer 80, and the second sheet 60, may be commercially available as a printing sheet such that users and card manufacturers can, for example, print the pattern 42 on the front face of the laminated body with an ink jet printer using an infrared non-absorbing material and the information code 20 on the rear face of the laminated body using an infrared absorbing material.

FIG. 2(c) illustrates a structure in which the rear face of the second sheet 60 and a front face of a third sheet 90 are stuck together with an adhesive. The rear face of the second sheet 60 and the front face of the third sheet 90 are opposed to each other. This sheet body offers further enhanced rigidity thanks to lamination of the three sheets. An adhesion layer 82 is made from an adhesive that transmits infrared radiation. The adhesion layer 82 ensures that infrared radiation that enters the front face of the first sheet 40 reaches the front face of the third sheet 90. It should be noted that the third sheet 90 is made from a material having high reflectance of infrared radiation (e.g., opaque white material). Therefore, the infrared sensor detects the information code 20 as a black area and an area without the information code 20 as a white area. It should be noted that at least the front face of the third sheet 90 need only have high reflectance of infrared radiation and that the entire third sheet 90 need not be made from an infrared reflecting material.

When the sheet body illustrated in FIG. 2(b) is placed on a table having high reflectance of infrared radiation, the infrared camera can suitably distinguish between an area with the information code 20 and that without the information code 20. However, if the table has low reflectance of infrared radiation (e.g., dark-colored table), it is likely that the infrared camera may detect the information code 20 with slightly lower accuracy. For this reason, the third sheet 90 having a white front face may be stuck to the rear face of the second sheet 60, thus providing enhanced reflectance of infrared radiation that transmits the second sheet 60 and allowing the infrared camera to suitably detect the information code 20.

The sheet body 30 illustrated in FIGS. 2(b) and 2(c) offers enhanced rigidity thanks to combining of the first and second sheets 40 and 60 by the adhesion layer 80. However, the rear face of the first sheet 40 and the front face of the second sheet 60 may be separate in such a manner as to be opposed to each other rather than being stuck together. An intermediate layer that transmits infrared radiation such as air layer is provided therebetween. Even in this case, it is preferred that the first and second sheets 40 and 60 should be joined at their peripheries and supported for enhanced rigidity.

FIG. 4(a) illustrates another example of a sectional structure of the sheet body. The sheet body 30 includes the first and second sheets 40 and 60. Here, the first sheet 40 makes up a first layer of the sheet body 30, and the second sheet 60 makes up a second layer of the sheet body 30. The printing layer 50 is provided on the front face of the first sheet 40. The pattern 42 is marked on the printing layer 50 by using an infrared non-absorbing material. Further, the printing layer 70 is provided on the front face of the second sheet 60. The information code 20 is marked on the printing layer 70 by using an infrared absorbing material. The rear face of the first sheet 40 and the front face of the second sheet 60 are opposed to each other. As described with reference to FIG. 2(a), an intermediate layer that transmits infrared radiation may be provided between the rear face of the first sheet 40 and the front face of the second sheet 60.

In the sheet body 30 illustrated in FIG. 4(a), the first sheet 40 is made from a material that transmits infrared radiation but not visible radiation (e.g., reflects visible radiation). The first layer 40 may be basically white film designed to transmit infrared radiation and cut visible radiation. On the other hand, the second sheet 60 is made from a material that has high reflectance of infrared radiation (e.g., opaque white material). It should be noted that at least the front face of the second sheet 60 need only have high reflectance of infrared radiation and that the entire second sheet 60 need not be made from an infrared reflecting material.

The sheet body 30 illustrated in FIG. 4(a) differs from the sheet body 30 illustrated in FIG. 2(a) in that the printing layer 70 is formed on the front face of the second sheet 60, and that the printing layer 70 is opposed to the rear face of the first sheet 40. Further, although the second sheet 60 is made from an infrared transmitting material in the sheet body 30 illustrated in FIG. 2(a), the second sheet 60 is made from an infrared reflecting material in the sheet body 30 illustrated in FIG. 4 (a). The second sheet 60 illustrated in FIG. 4 (a) may have the same property as the third sheet 90 illustrated in FIG. 2(c). It should be noted that the first sheet 40 of the sheet body 30 illustrated in FIG. 4(a) is also made from a material that transmits infrared radiation but not visible radiation (e.g., reflects visible radiation), and it is unchanged in this regard.

The sheet body 30 illustrated in FIG. 4(a) is placed in the card placement area 2 of a table such that the front face of the first sheet 40 is opposed to a direction of line of sight of the user and that of the code reader 200 (infrared camera) (i.e., such that the front face of the first sheet 40 faces up). Here, the first sheet 40 is made from a material that does not transmit visible radiation (e.g., reflects visible radiation). Therefore, there is no likelihood for the user to visually recognize the information code 20 marked on the second sheet 60 that is located under the first sheet 40 under visible radiation. As a result, the user sees the pattern 42 printed on the front face of the first sheet 40 without being aware of the information code 20 marked on the sheet body 30 under visible radiation. Thus, the information code 20 is provided on the sheet body 30 in such a manner as to be invisible.

On the other hand, the code reader 200 irradiates the card placement area 2 with infrared radiation, observing reflected radiation from the sheet body 30 with its infrared sensor. Infrared radiation irradiated onto the sheet body 30 transmits through the printing layer 50 and the first sheet 40, infrared transmission layers, being absorbed by the infrared absorbing material that forms the information code 20. The information code 20 is printed on the front face of the second sheet 60. It should be noted that areas on the front face of the second sheet 60 illustrated in FIG. 4(a) not printed with an infrared-absorbing material reflect infrared radiation and that, as a result, reflected radiation is observed by the infrared sensor. Therefore, the infrared sensor detects the information code 20 as a black area. Thus, the code reader 200, an infrared camera, is arranged above the sheet body 30 and irradiates infrared radiation onto the front face of the first sheet 40, thus allowing for proper reading of the information code 20 illustrated in FIG. 3(b).

FIG. 4(b) illustrates a structure in which the rear face of the first sheet 40 and the front face of the second sheet 60 are stuck together with an adhesive. The sheet body 30 offers enhanced rigidity thanks to the sticking of the first and second sheets 40 and 60. An adhesion layer 84 is made from an adhesive that transmits infrared radiation. The adhesion layer 84 ensures that infrared radiation that enters the front face of the first sheet 40 reaches the front face of the second sheet 60 and is reflected thereby. If the front face of the second sheet 60 is made from a material having high reflectance of infrared radiation, the infrared sensor detects the information code 20 as a black area and an area without the information code 20 as a white (or bright color) area.

The sheet body 30 illustrated in FIG. 4(b) offers enhanced rigidity thanks to combining of the first and second sheets 40 and 60 by the adhesion layer 84. However, the rear face of the first sheet 40 and the front face of the second sheet 60 may be separate in such a manner as to be opposed to each other rather than being stuck together. An intermediate layer that transmits infrared radiation is provided therebetween. Even in this case, it is preferred that the first and second sheets 40 and 60 should be joined at their peripheries and supported for enhanced rigidity.

Figure 5:
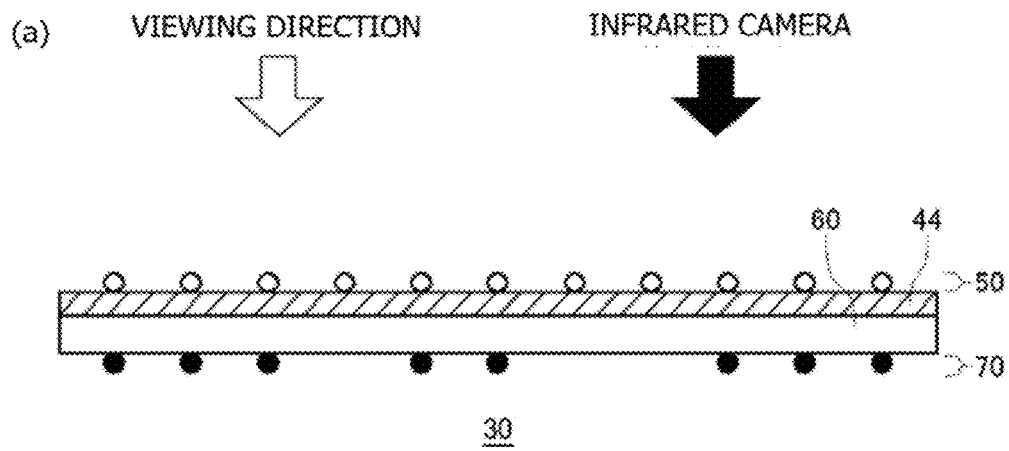
FIG. 5 depicts diagrams illustrating still another example of a sectional structure of a sheet body.
Figure 5:
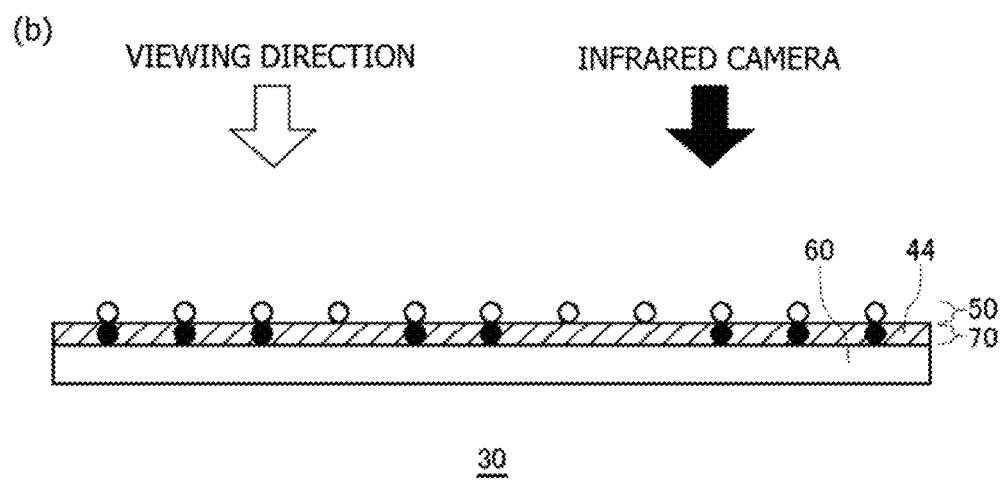

FIG. 5(a) illustrates still another example of a sectional structure of the sheet body. The sheet body 30 includes a coating layer 44 and the second sheet 60. Here, the coating layer 44 makes up a first layer of the sheet body 30, and the second sheet 60 makes up a second layer of the sheet body 30. The coating layer 44 is formed by coating the front face of the second sheet 60 with a material that transmits infrared radiation and reflects (cuts) visible radiation. The printing layer 50 is provided on the front face of the coating layer 44. The pattern 42 is marked on the printing layer 50 by using an infrared non-absorbing material. The second sheet 60 is made from a material that transmits infrared radiation and may be the same as the second sheet 60 illustrated in FIG. 2(a). Further, the printing layer 70 is provided on the rear face of the second sheet 60. An information code is marked on the printing layer 70 by using an infrared absorbing material.

The coating layer 44 is formed by coating the front face of the second sheet 60 with an ink. Therefore, the rear face of the coating layer 44 and the front face of the second sheet 60 are opposed to each other. It should be noted that the third sheet 90 illustrated in FIG. 2(c) may be stuck to the rear face of the second sheet 60. The coating layer 44 of the sheet body 30 illustrated in FIG. 5(a) has the same optical property as the first sheet 40 of the sheet body 30 illustrated in FIG. 2(a). The sheet body 30 illustrated in FIG. 5(a) is advantageous in that its manufacturing cost is low because the two sheets are not stuck together.

FIG. 5(b) illustrates still another example of a sectional structure of the sheet body. The sheet body 30 includes the coating layer 44 and the second sheet 60. Here, the coating layer 44 makes up a first layer of the sheet body 30, and the second sheet 60 makes up a second layer of the sheet body 30. The second sheet 60 is made from a material having high reflectance of infrared radiation (e.g., opaque white material). It should be noted that at least the front face of the second sheet 60 need only have high reflectance of infrared radiation and that the entire second sheet 60 need not be made from an infrared reflecting material.

The coating layer 44, the first layer, is formed by coating the front face of the second sheet 60 with a material that transmits infrared radiation, but not visible radiation (e.g., reflects visible radiation), with the printing layer 70 formed on the front face of the second sheet 60 by using an infrared absorbing material. The printing layer 70 includes the information code 20. The printing layer 50 marked with a pattern using an infrared non-absorbing material is provided on the front face of the coating layer 44. The second sheet 60 may be the same as the second sheet 60 illustrated in FIG. 4(a).

The coating layer 44 is formed by coating the front face of the second sheet 60 with an ink. Therefore, the rear face of the coating layer 44 and the front face of the second sheet 60 are opposed to each other. The coating layer 44 of the sheet body 30 illustrated in FIG. 5(b) has the same optical property as the first sheet 40 of the sheet body 30 illustrated in FIG. 4(a). The sheet body 30 illustrated in FIG. 5(b) is advantageous in that its manufacturing cost is low because the two sheets are not stuck together.

In the sheet body 30 illustrated in FIGS. 5(a) and 5(b), the second sheet 60 should preferably be thick to a certain extent to provide enhanced rigidity.

It should be noted that the sheet body 30 is required to be rigid when used as the card 10 particularly in a card game system, that is, when used alone. The manner in which the sheet body 30 is used will be described later. However, if the sheet body 30 is fastened to an enclosure for example, it may not be necessary to enhance the rigidity of the sheet body 30.

A description will be given below of a processing example of an image projection system 1 when the sheet body 30 is used as the card 10.

Figure 6:
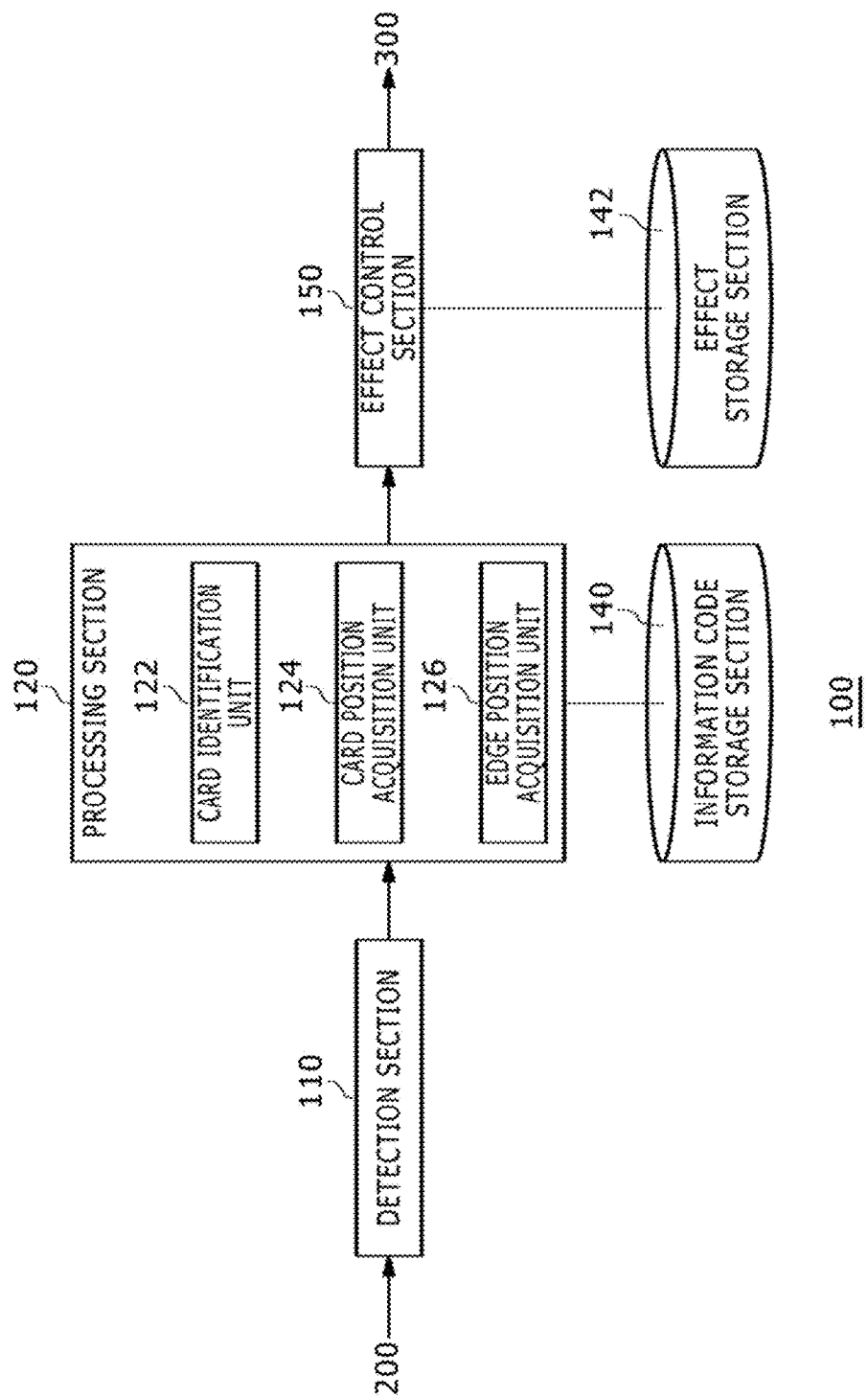
FIG. 6 is a diagram illustrating functional blocks of a processor.

FIG. 6 illustrates functional blocks of the processor 100. The processor 100 includes a detection section 110, a processing section 120, an information code storage section 140, an effect storage section 142, and an effect control section 150. The detection section 110 has a function to detect an information code marked on the card 10. The processing section 120 includes a card identification unit 122, a card position acquisition unit 124, and an edge position acquisition unit 126. The processing section 120 acquires information about the card 10 having that information code, a condition of the card 10 and so forth on the basis of the detected information code. The effect control section 150 controls effects applied to the card 10 on the basis of information provided by the processing section 120, and more specifically, the effect control section 150 causes an effect image to be projected onto the card 10 from the projection device 300.

The processing capability of the processor 100 in the present embodiment is implemented by a central processing unit (CPU), a memory, a program loaded into the memory, and so on, and the configuration implemented as a result of these components working in a coordinated fashion is depicted here. Therefore, it should be understood by those skilled in the art that these functional blocks can be implemented in various ways by hardware alone, software alone, or a combination thereof.

The information code storage section 140 stores information codes and identification information of the cards 10 having the information codes (hereinafter referred to as card identification (ID)) in association. The effect storage section 142 stores card IDs and descriptions of effects in association. Here, a description of an effect may be a still image projected onto the card 10. Alternatively, a description may be a movie projected onto the card 10. If the function of the effect control section 150 is implemented by a game program, the effect storage section 142 may store a program that represents descriptions of effects in accordance with the progress of the game. At this time, the effect storage section 142 may be a recording medium that records the game program (e.g., read-only memory (ROM) medium).

As illustrated in FIG. 1, the code reader 200, an infrared camera, and the projection device 300, a projector, are arranged above the card placement area 2. In the code reader 200, the light source irradiates infrared radiation onto the card placement area 2, and the infrared sensor detects radiation reflected from the card 10 that includes the information code 20. In the processor 100, the detection section 110 acquires the detection result of the infrared sensor, thus detecting the information code 20. The information code 20 is printed with an infrared absorbing material, allowing the infrared sensor to suitably detect the information code 20 as a black area.

Figure 7:
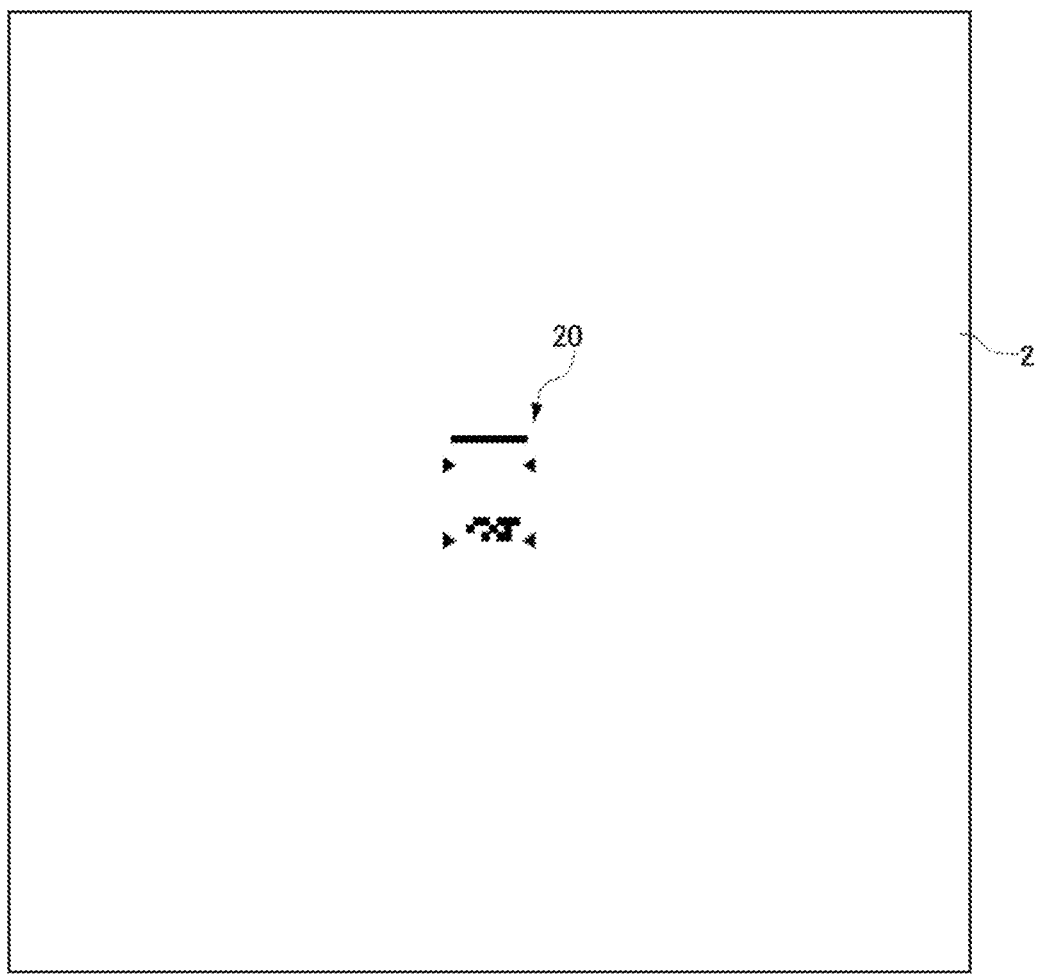
FIG. 7 is a diagram illustrating an example of a detection result of an infrared sensor.

FIG. 7 illustrates an example of a detection result of the infrared sensor. Thus, the code reader 200 acquires an infrared reflected image and hands it over to the detection section 110. It should be noted that the code reader 200 may periodically shoot infrared reflected images and provide such images, for example, every 1/60 of a second to the detection section 110. A description will be given below of an algorithm by which the detection section 110 detects the information code 20 illustrated in FIG. 7.

First, the detection section 110 detects the reference cell 21 that extends linearly in a shot image and verifies the presence of the triangular corner cells 22 that are located vertically from both ends of the detected reference cell 21. Here, when the presence of the two corner cells 22 is verified in a vertical direction from each end, the detection section 110 extracts a layout of the plurality of square cells 23 from the area surrounded by the four corner cells 22. The information code 20 of the card 10 is detected by the algorithm described above. The detection section 110 notifies the detection result of the information code 20 to the processing section 120. Here, the detection result includes at least a layout of the square cells 23 extracted from the information code 20 and the position coordinates of the information code 20 in the card placement area 2. It should be noted that although the detection section 110 and the processing section 120 are depicted as different functional blocks in FIG. 6, the function of the detection section 110 may be incorporated in the processing section 120. Alternatively, the function of the detection section 110 may be incorporated in the code reader 200 rather than in the processing section 120.

The information code storage section 140 stores all the information codes 20 available with a card game and identification information of the cards 10 (card IDs) in association. If the information code 20 is a two-dimensional code illustrated in FIG. 3(*b*), the information code storage section 140 may store a layout of the plurality of square cells 23 of the information code 20 and the card IDs in association.

The processing section 120 performs a variety of processing tasks using a detection result of the detection section 110. First, the card identification unit 122 compares the layout of the square cells 23 detected by the detection section 110 against the layout of the square cells 23 stored in the information code storage section 140, thus identifying the card ID of the matching layout. If the information code storage section 140 holds the information code 20 as image information, the card identification unit 122 performs pattern matching between the image of the detected information code 20 and the image information held in the information code storage section 140, thus identifying image information matching the detected information code image and the card ID associated therewith. In pattern matching, the detected layout image of the square cells 23 may be compared against the layout image of the square cells 23 held in the information code storage section 140. It should be noted that if the information code storage section 140 holds a bit pattern of the square cells 23, the card identification unit 122 may compare the detected bit pattern of the square cells 23 against the bit patterns of the square cells 23 held in the information code storage section 140, thus identifying the bit pattern matching that of the detected layout of the square cells 23 and the card ID associated therewith. The card identification unit 122 hands the identified card ID over to the card position acquisition unit 124 and the edge position acquisition unit 126.

The card position acquisition unit 124 acquires the position coordinates of the card 10 in the card placement area 2 from the position coordinates of the information code 20 detected by the detection section 110. If the card 10 is rectangular, the acquired position coordinates may be those of the four vertices of the card 10 in the card placement area 2. It should be noted that the card position acquisition unit 124 also acquires the posture of the card 10 in the card placement area 2, i.e., angular information representing the tilt of the card placement area 2 in a two-dimensional coordinate system. This angular information is expressed as a tilt from the lower to upper sides of the card 10. Therefore, angular information is positive or negative depending on which side is up.

It should be noted that three coordinate systems, a real world coordinate system of the card placement area 2, a camera coordinate system of the code reader 200, and a projector coordinate system of the projection device 300, are available in a manner independent from each other in the image projection system 1 using the card 10. The processing section 120 has a coordinate adjustment function to automatically adjust these coordinate systems. As a result, position coordinates of the information code 20 detected by the code reader 200 are converted by the processing section 120 into the position coordinates of the card placement area 2 for use. Further, position coordinates of the card placement area 2 are converted by the processing section 120 into the position coordinates of the projector coordinate system in the projection device 300 and provided to the projection device 300. A description will be given below by assuming that the processing section 120 has this coordinate adjustment function and regarding a variety of position coordinates as the same as those of the two-dimensional coordinate system of the card placement area 2.

The card position acquisition unit 124 holds, in advance, a positional relationship between the reference cell 21 and the corner cells 22 of the card 10. Therefore, when the detection section 110 detects the information code 20, the card position acquisition unit 124 can acquire coordinates of the four vertices and angular information of the card 10 in the two-dimensional coordinate system.

Although a case was depicted above in which the information code 20 was a two-dimensional code illustrated in FIG. 3(*b*), the information code 20 may be a drawing printed on the second layer of the card 10 for example. In this case, when the detection section 110 detects the information code 20, the card position acquisition unit 124 can acquire the coordinates of the four vertices and angular information of the card 10 in the two-dimensional coordinate system by identifying the outline of the drawing.

The card position acquisition unit 124 hands the coordinates of the four vertices and angular information of the card 10 over to the effect control section 150 together with the card ID. It should be noted that, as the position coordinates of the card 10, the card position acquisition unit 124 may derive coordinates of the center of gravity of the card 10 and hand the coordinates of the center of gravity and angular information of the card 10 over to the effect control section 150 together with the card ID.

The edge position acquisition unit 126 acquires edge position coordinates of the card 10. If the card 10 is rectangular, the edge position acquisition unit 126 can acquire position coordinates of outer edges of the card 10 from the coordinates of the four vertices acquired by the card position acquisition unit 124. In this case, the position coordinates of the outer edges of the card 10 are acquired by identifying the line connecting the coordinates of the two adjacent vertices.

It should be noted that the card 10 may be, for example, circular rather than rectangular. In this case, the card position acquisition unit 124 holds, in advance, a radius of the circular card 10. Therefore, the card position acquisition unit 124 acquires the coordinates of the center of the card 10 and hands the coordinates of the center and the radius of the card 10 over to the edge position acquisition unit 126. This allows the edge position acquisition unit 126 to acquire the outer edge position coordinates of the card 10. It should be noted that the radius of the card 10 may be held by the edge position acquisition unit 126.

Thus, the edge position acquisition unit 126 has a function to identify the outer edges of the card 10 placed in the card placement area 2. The outer edges of the card 10 serve as reference for the projection device 300 to project image light. Therefore, the edge position acquisition unit 126 hands the outer edge position coordinates of the card 10 over to the effect control section 150 together with the card ID. It should be noted that the function of the edge position acquisition unit 126 may be incorporated in the card position acquisition unit 124. In this case, the card position acquisition unit 124 hands the outer edge position coordinates of the card 10 over to the effect control section 150 together with the card ID. Alternatively, the function of the card position acquisition unit 124 may be incorporated in the effect control section 150.

The card 10 placed in the card placement area 2 may be moved by the user as the game progresses. For this reason, the processing section 120 has a function to track the card 10 that has been detected. The card position acquisition unit 124 acquires the position coordinates and angular information of the card 10 for each captured image, and the edge position acquisition unit 126 acquires the edge position coordinates of the card 10 for each captured image.

The effect control section 150 is, for example, a game engine, controlling effects applied to the card 10 in accordance with the card ID provided from the processing section 120. The effect storage section 142 stores card IDs and effect patterns in association. Effect patterns may be still images or movies. As described above, effect patterns may be made up of a game program. In any case, the effect storage section 142 stores effect patterns associated with the card IDs.

The effect control section 150 controls image projection of the projection device 300 in accordance with the effect patterns stored in the effect storage section 142. More specifically, the effect control section 150 reads, from the effect storage section 142, the effect image associated with the card ID provided from the processing section 120 or generates an effect image in accordance with the effect pattern read from the effect storage section 142, causing the effect image to be projected onto the card 10 from the projection device 300 on the basis of position information of the card 10. More specifically, the effect control section 150 causes the projection device 300 to project the effect image 3 associated with the card 10 on the basis of edge position coordinates of the card 10. This allows the user to see the effect image projected onto the card 10 and enjoy effects of the game.

A description has been given above of a case in which the sheet body 30 illustrated in FIGS. 2 to 5 is used as the card 10 in a card game. It has been depicted that, in the sheet body 30, the pattern 42 such as game character is printed on the front face of the first sheet 40 such that the user can see the pattern printed on the front face of the card 10 in a normal environment. However, an information code that can be imaged by a visible radiation camera, for example, may be printed on the front face of the first sheet 40. The game system may include visible and infrared radiation cameras and progress the game by using two identification codes, one detected by the visible radiation camera and another by the infrared radiation camera. At this time, these identification codes may be the same or different.

A description will be given below of the manner in which the sheet body 30 is used in the present embodiment. The sheet body 30 can be used, for example, as an event poster. An event photograph, illustration, letter, or other, is printed on the front face of the first layer with an infrared non-absorbing material (infrared transmitting material), and the information code 20 that states a uniform resource locator (URL) for accessing that event information is printed on the front or rear face of the second layer with an infrared absorbing material. When the poster is stuck to the wall with the front face of the first layer faces out, the user can see the photograph, illustration, letter, and so on. Further, the user can read the information code 20 marked on the second layer and access an event information page by imaging the poster with a mobile terminal (e.g., smartphone) having an infrared camera.

Figure 8:
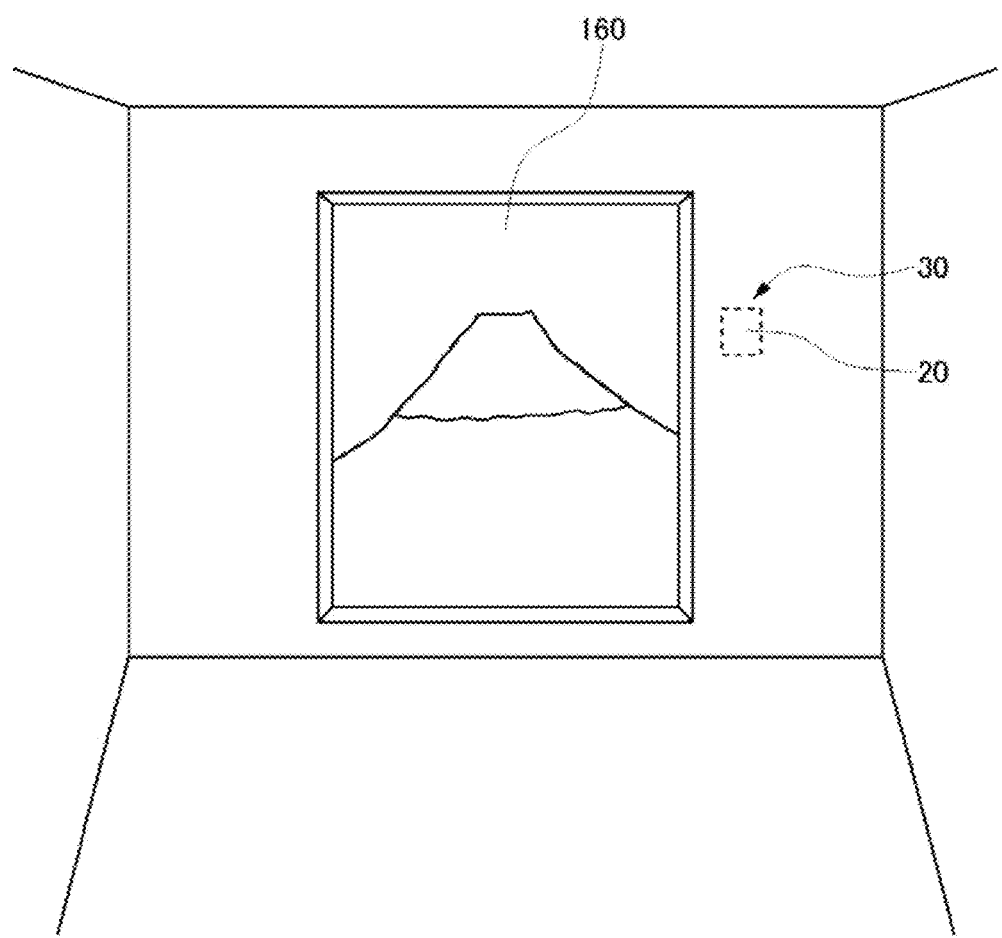
FIG. 8 is a diagram illustrating an example in which a sheet body is assimilated into a wall in a museum.
Figure 9:
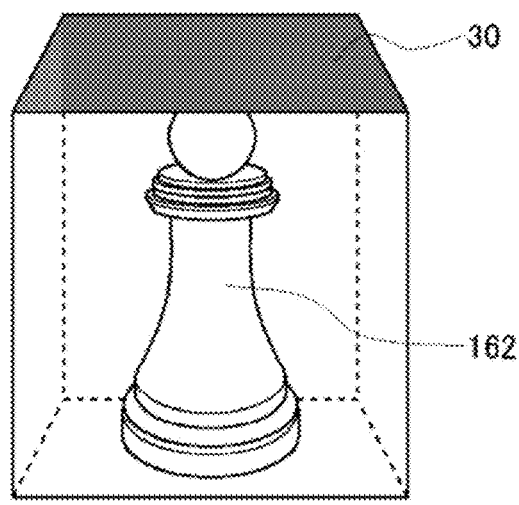
FIG. 9 depicts diagrams illustrating an example of a stereoscopic piece used in a game system.
Figure 9:
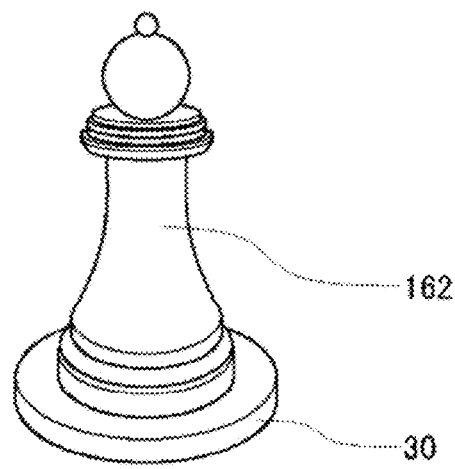
Figure 9:
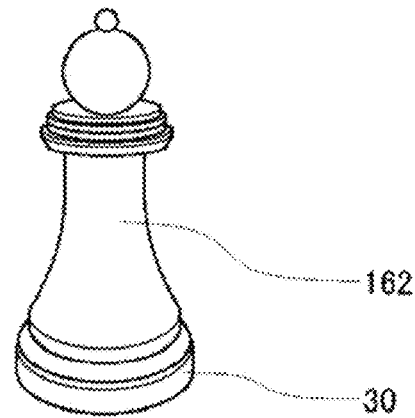
Figure 10:
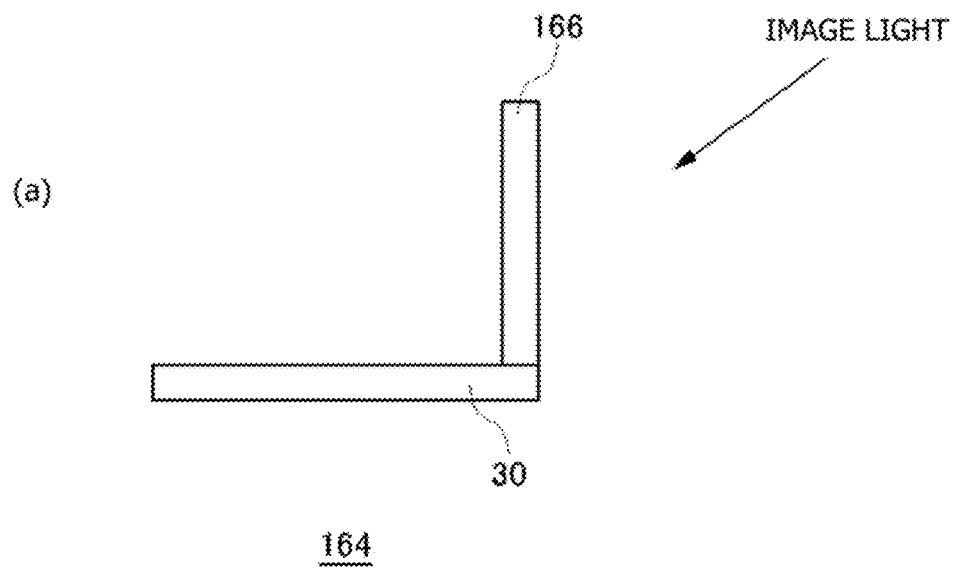
FIG. 10 depicts diagrams illustrating another example of a stereoscopic piece used in the game system.
Figure 10:
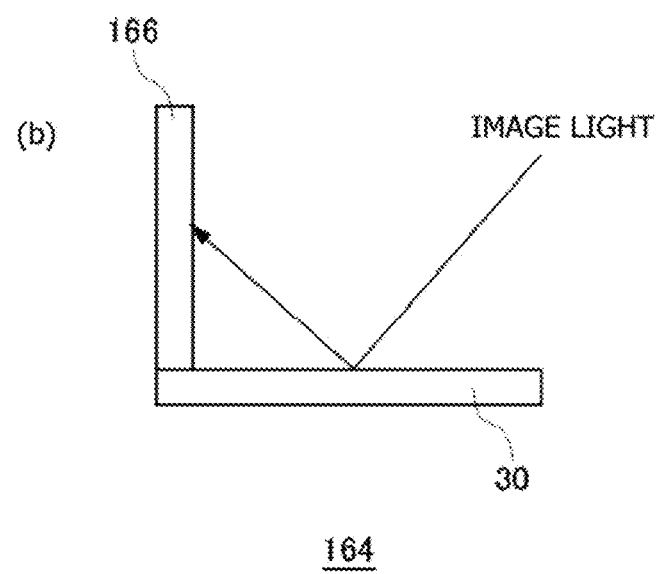
Figure 11:
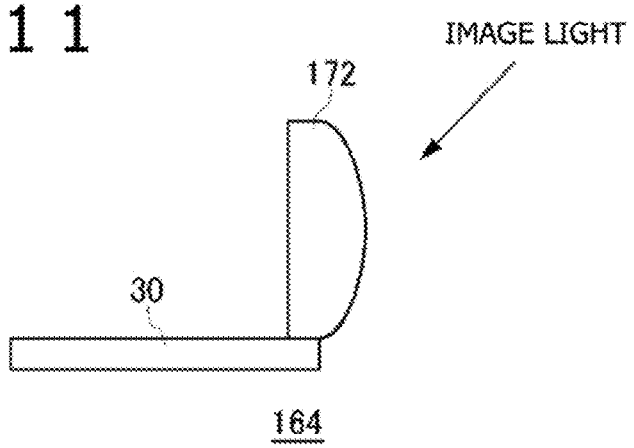
FIG. 11 depicts diagrams illustrating still another example of a stereoscopic piece used in the game system.
Figure 11:
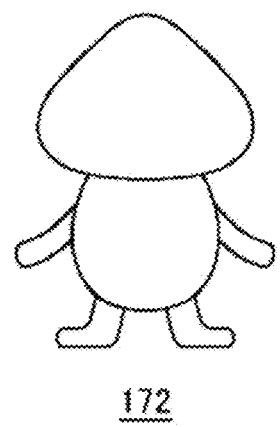
Figure 11:
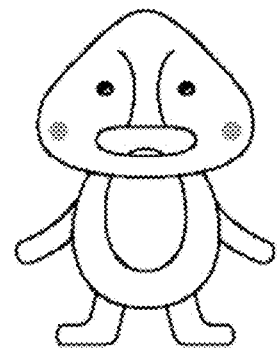

FIG. 8 illustrates an example in which the sheet body 30 is assimilated into a wall in a museum. An infrared non-absorbing material of the same color as the wall color of the museum is applied to (printed on) the front face of the first layer of the sheet body 30, thus allowing the sheet body 30 to merge into the wall. This renders the sheet body 30 invisible or difficult to see to the user. When the user images a painting 160 or its surrounding area with a head-mounted display having an infrared camera or a mobile terminal, the infrared sensor detects the information code 20 marked on the sheet body 30. If a URL for accessing a painting information page or information about the painting is recorded in the information code 20, the user can acquire information about the painting with ease.

FIGS. 9 to 12 illustrate examples of the sheet body 30 and objects (three-dimensional media or stereoscopic objects)

having a member joined to the sheet body 30. FIGS. 9(a) to 9(c) illustrate an example of a stereoscopic piece used in the game system.

FIG. 9(a) illustrates an example in which a stereoscopic piece 162 is put in a transparent box. The sheet body 30 is placed on a top face of the transparent box. This allows the user to see the stereoscopic piece 162 through the transparent wall and also allows the code reader 200 to read the information code 20 marked on the sheet body 30.

FIG. 9(b) illustrates an example in which the sheet body 30 is used as a platform of the stereoscopic piece 162. At this time, the stereoscopic piece 162 is made from a material that can transmit infrared radiation and coated with a dye that can transmit infrared radiation (infrared non-absorbing material). This allows the user to see the stereoscopic piece 162 and also allows the code reader 200 to read the information code 20 marked on the sheet body 30.

FIG. 9(c) illustrates an example in which the sheet body 30 is placed on a bottom face of the stereoscopic piece 162. As in FIG. 9(b), the stereoscopic piece 162 is made from a material that can transmit infrared radiation and coated with a dye that can transmit infrared radiation (infrared non-absorbing material). This allows the user to see the stereoscopic piece 162 and also allows the code reader 200 to read the information code 20 marked on the sheet body 30.

The stereoscopic pieces 162, stereoscopic objects illustrated in FIGS. 9(b) and 9(c), are common in that these pieces are both made from materials that transmit infrared radiation, and that the front faces thereof are covered with materials that transmit infrared radiation but not visible radiation (e.g., reflect visible radiation). The front faces thereof may be coated with such a material.

The stereoscopic piece 162 may have code sections, made from an infrared absorbing material, embedded therein. Here, the code sections are code elements that form the information code 20 and, more specifically, the reference cell 21, the corner cells 22, and the square cells 23 illustrated in FIG. 3(b). One way of embedding the code sections is, as illustrated in FIG. 9(c), to place the sheet body 30 marked with the information code 20 on the bottom face of the stereoscopic piece 162. Another way of doing so is to place the information code 20 at an area other than the bottom face of the stereoscopic piece 162. During resin molding of the stereoscopic piece 162, for example, two parts, one for a lower portion and another for an upper portion, are prepared. Then, the top face of the lower part or the bottom face of the upper part is printed with the information code 20, after which the lower face of the upper part and the upper face of the lower part are stuck together, thus preparing the stereoscopic piece 162. This allows the code section made from an infrared absorbing material to be embedded in the stereoscopic piece 162.

When the stereoscopic piece 162 is moved by the user in the area 2 illustrated in FIG. 1 in particular, and if the information code 20 is hidden by the user's hand, there is a likelihood that the accuracy with which the infrared camera detects the information code 20 may deteriorate. Therefore, it is preferred that the code section making up the information code 20 should be embedded in the stereoscopic piece 162 where it is not hidden by a hand such as upper portion of the stereoscopic piece 162 for example. Although a chess piece is depicted as an example of a stereoscopic object in FIG. 9(c), and if a chess piece is used, a code section should preferably be embedded in a head portion of the piece for enhanced detection accuracy by the infrared camera.

FIGS. 10(a) and 10(b) illustrate another example of the stereoscopic piece 164 having a screen 166 provided upright from the sheet body 30 with the sheet body 30 serving as a platform. It should be noted that the sheet body 30 may be housed in an enclosure.

FIG. 10(a) illustrates the stereoscopic piece 164. Image light, irradiated from the projection device 300, is directly projected onto the screen 166 of the stereoscopic piece 164. The screen 166 may be the screen that transmits infrared radiation and scatters visible radiation.

FIG. 10(b) illustrates the stereoscopic piece 164. Image light, irradiated from the projection device 300, is reflected by the front face of the sheet body 30 and projected onto the screen 166 of the stereoscopic piece 164. In the stereoscopic piece 164, a cold mirror that transmits infrared radiation and reflects visible radiation is used as the first layer of the sheet body 30. It should be noted that the printing layer 50 should preferably be not formed on the front face of the cold mirror and that the cold mirror should preferably totally reflect incident image light toward the screen 166.

FIG. 11(a) illustrates an example of the stereoscopic piece 164 having an object 172 provided upright from the sheet body 30 with the sheet body 30 serving as a platform. In contrast to the stereoscopic piece 164 illustrated in FIGS. 10(a) and 10(b) in which image light is projected onto the screen 166, image light is projected onto the object 172 in the stereoscopic piece 164 illustrated in FIG. 11(a).

The object 172 is made from a material that transmits infrared radiation, and the front face thereof is covered with a material that transmits infrared radiation and does not transmit visible radiation (e.g., reflects visible radiation). The front face of the object 174 should preferably be coated with a white paint to suitably reflect projected image light. The object 172 has a stereoscopic front face onto which image light is projected. The processor 100 is aware of the stereoscopic shape of the object 172 in advance. Therefore, when identifying the stereoscopic piece 164 by the information code 20 marked on the sheet body 30, the processor 100 causes image light to be projected from the projection device 300 in such a manner as to fit the stereoscopic shape of the object 172.

FIG. 11(b) illustrates an example of the front face of the object 172. The front face of the object 172 is white and is not marked with any pattern. In this example, the object 172 is a figurine that mimics a character shape. FIG. 11(c) illustrates that image light is projected onto the front face of the object 172. The object 172 is recognized by the user as a character as image light of the character is projected onto the object 172. It should be noted that the processor 100 can specify a character to be projected in response to a game scene for example, thus allowing the user to use the single stereoscopic piece 164 as a piece having a variety of characters. It should be noted that large projections and depressions of the stereoscopic shape of the object 172 makes it more likely that shadows are cast by image light to be projected. Therefore, the stereoscopic shape of the object 172 should preferably have only small projections and depressions. It should be noted that in a case the projection mapping performs, the processor 100 may create shadows on a character to be projected to make the character look more real.

It should be noted that the processor 100 may take advantage of the fact that it is aware of the stereoscopic shape of the object 172, recognizing the stereoscopic shape thereof by using, for example, a depth camera and identifying the object 172 by the stereoscopic shape thereof. It should be noted that, in this case, it is necessary that all the objects 172 placed in the area 2 should have different stereoscopic shapes and that, therefore, the object 172 should be identified by the recognized stereoscopic shape. At this time, the object 172 can be identified without adding the sheet body 30 to the object 172. Even in this case, the sheet body 30 should preferably be added to the object 172 for enhanced recognition accuracy.

It should be noted that the processor 100 may recognize the pattern 42 marked on the sheet body 30, a collectable card, and identify the stereoscopic piece 164 by the pattern. Even in this case, the information code 20 marked on the sheet body 30 provides enhanced recognition accuracy.

Figure 12:
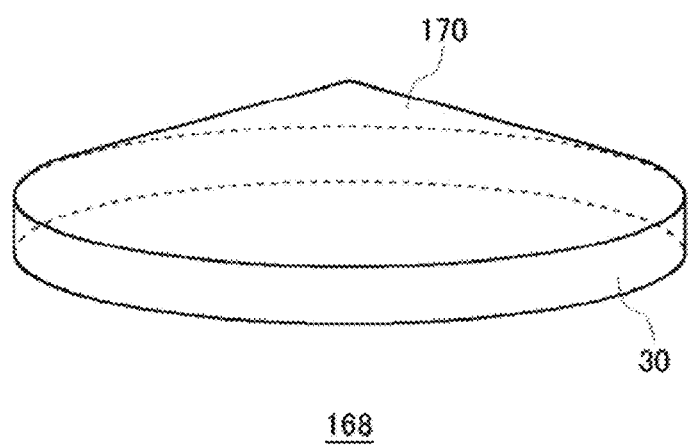
FIG. 12 is a diagram illustrating still another example of a stereoscopic piece used in the game system.

FIG. 12 illustrates an example of a stereoscopic piece 168 having a conic screen 170 on top of the sheet body 30 with the sheet body 30 serving as a platform. It should be noted that the sheet body 30 may be housed in an enclosure. In the stereoscopic piece 168, a cold mirror that transmits infrared radiation and reflects visible radiation is used as the first layer of the sheet body 30. It should be noted that the printing layer 50 is not formed on the front face of the cold mirror. The screen 170 has an optical property to transmit direct radiation from the projection device 300 and project reflected radiation from the cold mirror. It should be noted that the screen 170 is not limited to being conic in shape and may be cubic, spherical, or cylindrical in shape.

The user uses these stereoscopic pieces and enjoy the card game in the image projection system 1. When the information code 20 is provided on the stereoscopic piece in such a manner as to be invisible, a mechanism can be implemented in which the information code 20 is automatically processed by the image projection system 1 without the user being aware of the presence of the information code 20.

The present invention has been described above based on an embodiment. It should be understood by those skilled in the art that the above embodiment is illustrative, that the combination of components and processes can be modified in various ways, and that such modification examples also fall within the scope of the present invention. An example has been depicted in the present embodiment in which the pattern 42 is marked on the first layer of the sheet body 30, and the information code 20 is marked on the second layer thereof. However, the pattern 42 and the information code 20 may be marked together on the second layer. In this case, no pattern is observed on the front face of the first layer even when the sheet body 30 is seen from the side of the first layer. When the sheet body 30 is imaged with an infrared camera from the side of the first layer, the information code 20 is detected. On the other hand, when the sheet body 30 is seen from the side of the second layer, the pattern 42 and the information code 20 are observed. For example, a mechanism is implemented in which the information code 20 is formed in such a manner as to make up part of the pattern 42 and the information code 20 is automatically processed by the image projection system 1 without the user being aware of the information code 20.

In a modification example, the sheet body 30 may have only a first layer that is made from a material that transmits infrared radiation but not visible radiation (e.g., reflects visible radiation), with the pattern 42 marked on the front face and the information code 20 on the rear face thereof. In the sheet body 30 of the present modification example, if the pattern 42 and the information code 20 are marked on the rear face of the first layer (e.g., first sheet 40), no pattern is observed on the front face of the first layer even when the sheet body 30 is seen from the side of the front face. When the sheet body 30 is imaged with an infrared camera from the side of the front face, the information code 20 is detected. On the other hand, when the sheet body 30 is seen from the side of the second layer, the pattern 42 and the information code 20 are observed. As described above, a mechanism is implemented in which the information code 20 is formed in such a manner as to make up part of the pattern 42 and the information code 20 is automatically processed in the image projection system 1 without the user being aware of the information code 20.

Further, the sheet body 30 illustrated in FIGS. 2(*a*) and 5(*b*) allows the information code 20 to be read by the code reader 200 from the sides of the front and rear faces. At this time, the information code 20 read from the side of the front face and the information code 20 read from the side of the rear face are horizontally flipped relative to each other. For this reason, the processor 100 can judge whether the front or rear face of the sheet body 30 is used as a top face in accordance with the shape of the information code 20 read by the code reader 200.

Figure 13:
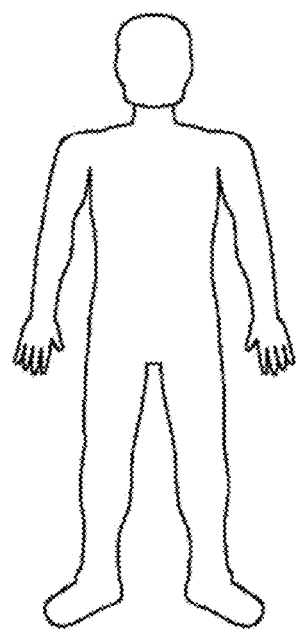
FIG. 13 depicts diagrams illustrating an example of a stereoscopic object having movable parts that change their shapes.
Figure 13:
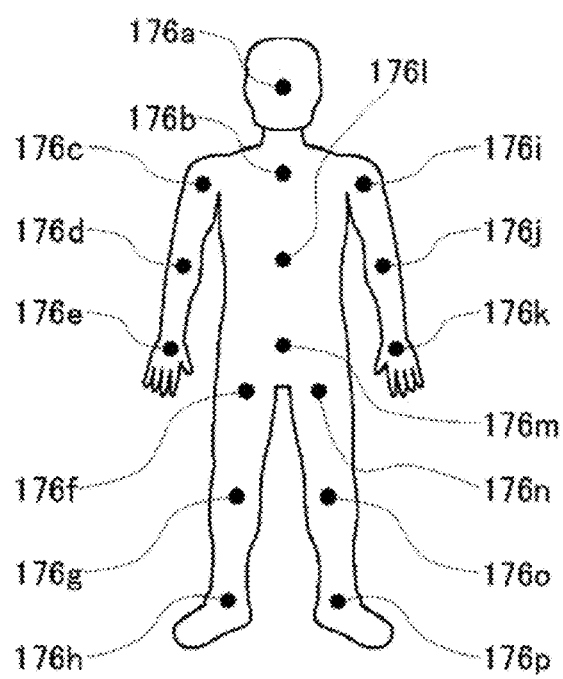

FIG. 13(*a*) illustrates an example of the stereoscopic object 174 having movable parts that change their shapes. The object 174 is a movable figurine that can change its shape (figurine's posture in this case) by moving its joints. The object 174 is made from a material that transmits infrared radiation and is covered with a material that does not transmit visible radiation (e.g., reflects visible radiation). The front face of the object 174 should preferably be coated with a white paint to suitably reflect projected image light. It should be noted that the object 174, a figurine, may be moved manually by the user. Alternatively, the joints of the object 174 may be motor-operated such that the object 174 moves in response to instructions from a game program.

FIG. 13(*b*) illustrates how code sections made from an infrared absorbing material are embedded in the figurine. Code sections 176*a* to 176*p* are embedded in the object 174 such that when the object 174 changes its shape as a result of movement of the movable parts, relative positions of the code sections 176*a* to 176*p* in the object 174 change. Each of the code sections 176 should preferably have a three-dimensional shape such as spherical or cubic that allows easy imaging with an infrared camera.

A description will be given below of a processing example of the image projection system 1 that projects image light onto the object 174.

Figure 14:
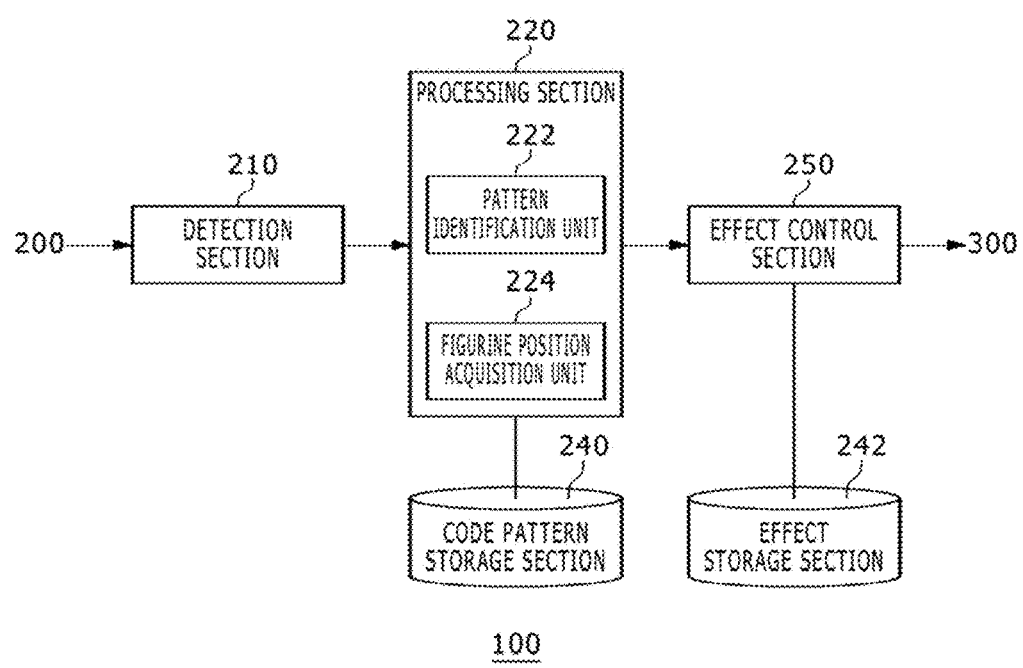
FIG. 14 is a diagram illustrating a modification example of functional blocks of the processor.

FIG. 14 illustrates a modification example of functional blocks of the processor 100. The processor 100 includes a detection section 210, a processing section 220, a code pattern storage section 240, an effect storage section 242, and an effect control section 250. The detection section 210 has a function to detect a plurality of code sections 176 in the object 174. The processing section 220 includes a pattern identification unit 222 and a figurine position acquisition unit 224, acquiring type information that matches the code pattern and the position of the object 174 on the basis of a layout of the plurality of code sections detected (code pattern). The effect control section 250 controls effects of the object 174 on the basis of type information provided from the processing section 220, and more specifically, the effect control section 250 causes an effect image to be projected onto the object 174 from the projection device 300.

The processing capability of the processor 100 in the present modification example is implemented by a CPU, a memory, a program loaded into the memory, and so on, and the configuration implemented as a result of these components working in a coordinated fashion is depicted here. Therefore, it should be understood by those skilled in the art that these functional blocks can be implemented in various ways by hardware alone, software alone, or a combination thereof.

In the present modification example, the code pattern storage section 240 stores a code pattern formed by the plurality of code sections 176 and type information thereof in association. The code pattern identifies a posture of the object 174, a figurine, and may define a relative layout of all the code sections 176a to 176p. However, the code pattern may include a relative layout of some of the code sections 176. The code pattern of some of the code sections 176 may include a layout of the plurality of code sections 176 included in the upper body of the figurine. Alternatively, the code pattern may include a layout of the plurality of code sections 176 included in the right side of the body of the figurine.

The effect storage section 242 stores code pattern type information and descriptions of effects in association. Here, a description of effect may be a still image or movie projected onto the object 174, a figurine and may, for example, be an image that includes a character's face and costume. For example, type information is associated with character's signature poses. When the character poses, an image associated with the signature pose is projected onto the figurine.

In the present modification example, the object 174, a figurine, is placed in the card placement area 2 illustrated in FIG. 1. In the code reader 200, the light source irradiates the card placement area 2 with infrared radiation, and the infrared sensor detects radiation reflected from the object 174 having the plurality of code sections 176 therein. In the processor 100, the detection section 210 acquires the detection result of the infrared sensor, thus detecting the plurality of code sections 176. The code sections 176 are made from an infrared absorbing material, allowing the infrared sensor to suitably detect the code sections 176 as black areas. The code reader 200 may periodically shoot infrared reflected images and provide such infrared reflected images, for example, every ¹⁄₆₀ of a second to the detection section 210. The function of the detection section 210 may be incorporated in the processing section 220. Alternatively, the function of the detection section 210 may be incorporated in the code reader 200 rather than in the processing section 220.

The processing section 220 performs a variety of processing tasks using a detection result of the detection section 210. First, the pattern identification unit 222 compares the layout of the plurality of code sections 176 detected by the detection section 210 against the code pattern stored in the code pattern storage section 240, thus identifying type information of the matching code pattern. It should be noted that the object 174 is a stereoscopic object. Therefore, the pattern identification unit 222 should preferably affine-transform the image shot with the infrared camera, thus converting the image into an image of the figurine as seen from the front and comparing that image against the code pattern stored in the code pattern storage section 240. The pattern identification unit 222 hands the identified type information over to the effect control section 250.

The figurine position acquisition unit 224 acquires the position coordinates and posture of the object 174 in the card placement area 2 from the position coordinates of the plurality of code sections 176 detected by the detection section 210, handing these pieces of information over to the effect control section 250.

The effect control section 250 is, for example, a game engine, controlling effects applied to the object 174 in accordance with the type, position, and posture information provided from the processing section 220. The effect storage section 242 stores type information and effect patterns in association. Effect patterns may be still images or movies as described above.

The effect control section 250 controls image projection of the projection device 300 in accordance with the effect patterns stored in the effect storage section 242. More specifically, the effect control section 250 reads, from the effect storage section 242, the effect image associated with the type information provided from the processing section 220 or generates an effect image in accordance with the effect pattern read from the effect storage section 242, causing an effect image to be projected onto the card object 174 from the projection device 300 on the basis of position and posture information of the object 174. This allows the user to see the effect image projected onto the object 174 and enjoy effects of the game.

It has been described that the effect control sections 150 and 250 control projection of effect images in relation to an embodiment and a modification example. However, the effect control sections 150 and 250 may control other effects. For example, the effect control sections 150 and 250 may produce an effect that makes it look as if sounds are produced from the target onto which an effect image is projected. In this case, the image projection system 1 may include a directional speaker, and the processor 100 may project an effect image onto a target and control the directional speaker to produce sounds to the target to make it look as if sounds are produced from the target.

Further, the effect control sections 150 and 250 may determine an effect pattern to be read from the effect storage sections 142 and 242 by referring to the user's attribute and other information. For example, if the user has a Japanese nationality, an effect pattern including Japanese may be selected, and if the user has a United States nationality, an effect pattern including English may be selected.

Further, in the embodiment, it has been described that the information code 20 is marked by using an infrared absorbing material that absorbs infrared radiation. Here, the information code 20 is made from an infrared absorbing material to ensure that the information code 20 is detected as black and other areas as a color other than black in an infrared reflected image as illustrated in FIG. 7. That is, it is only necessary that there should be contrast between the information code 20 and other areas in an infrared reflected image, thus allowing the detection section 110 to detect the information code 20.

In the modification example, therefore, the information code 20 may be marked by using an infrared reflecting material that reflects infrared radiation, and at least the surrounding area of the information code 20 may be made from an infrared absorbing material, thus producing contrast between the information code 20 and other areas. For example, if the printing layer 70 (information code 20) is made from an infrared reflecting material in the sheet body 30 illustrated in FIGS. 2(a) and 2(b), and if the sheet body 30 is placed on a table having low infrared reflection property, the table is detected as black, and the information code 20 is detected as white on the other hand. This contrast allows the detection section 110 to detect the information code 20. It should be noted that when made from a retroreflective material, the information code 20 to be detected has a sharper outline, thus ensuring enhanced detection accuracy. Similarly, in the sheet body illustrated in FIG. 2(c), the information code 20 may be marked by using an infrared reflecting material, and the third sheet 90 made from an infrared absorbing material. It should be noted that an infrared reflecting material need not reflect all light waves in the infrared region and need only have a reflection coefficient that allows for detection of reflected infrared radiation by the sensor of the code reader 200. Naturally, the infrared reflecting material of the information code 20 has higher infrared reflection property than the infrared absorbing material of the third sheet 90, and the larger the difference in reflectance, the higher the detection accuracy of the information code 20.

Still similarly, in the sheet body illustrated in FIGS. 4(*a*), 4(*b*), and 5(*b*), the printing layer 70 (information code 20) may be made from an infrared reflecting material, and the second sheet 60 from an infrared absorbing material. Further, it has been described that the code sections made from an infrared absorbing material may be embedded in the stereoscopic piece 162 of the present embodiment in relation to the stereoscopic piece 162. However, code sections made from an infrared reflecting material may be embedded. During resin molding of the stereoscopic piece 162, two parts, one for the lower portion and another for the upper portion, are prepared. Then, the bottom face of the upper part is printed with the information code 20 by using an infrared reflecting material, and the top face of the lower part coated with an infrared absorbing material, after which the lower face of the upper part and the upper face of the lower part are stuck together, thus preparing the stereoscopic piece 162. This allows the code sections made from an infrared reflecting material to be embedded in the stereoscopic piece 162.

REFERENCE SIGNS LIST

1 . . . Image projection system, 2 . . . Card placement area, 3 . . . Effect image, 4 . . . Table, 10 . . . Card, 20 . . . Information code, 30 . . . Sheet body, 40 . . . First sheet, 42 . . . Pattern, 44 . . . Coating layer, 50 . . . Printing layer, 60 . . . Second sheet, 70 . . . Printing layer, 80, 82, 84 . . . Adhesion layers, 90 . . . Third sheet, 100 . . . Processor, 200 . . . Code reader, 300 . . . Projection device.

INDUSTRIAL APPLICABILITY

The present invention is applicable to technical fields where information code is used.

The invention claimed is:

1. A stereoscopic object made from a material that transmits infrared radiation, the stereoscopic object comprising:
   a front layer covered with a material that transmits infrared radiation and does not transmit visible radiation;
   a rear layer covered with a material that absorbs infrared radiation; and
   a code section formed on the a front surface of the rear layer made from an infrared reflecting material.

2. The stereoscopic object of claim 1, wherein the code section forms an information code in the stereoscopic object.

3. The stereoscopic object of claim 1, further comprising:
   at least two movable parts that change their shapes with respect to other parts of stereoscopic object,
   wherein the code section is embedded such that when the stereoscopic object changes its shape as a result of movement of the at least two movable parts, a relative position of the code section in the stereoscopic object changes.

4. A stereoscopic object comprising:
   a platform; and
   an object provided on the platform,
   wherein a code section made from an infrared absorbing or reflecting material is provided on the platform, and
   an exterior of the object is made from a material that transmits infrared radiation but not visible radiation or scatters visible radiation,
   wherein the code section is located underneath the exterior of the object.

5. The stereoscopic object of claim 4, wherein the object is a screen.

6. A stereoscopic object comprising:
   a front layer covered with a material that transmits infrared radiation and does not transmit visible radiation;
   a rear layer covered with a material that reflects infrared radiation; and
   a code section formed on the a front surface of the rear layer made from an infrared absorbing material.

\* \* \* \* \*